US012613914B2

(12) United States Patent
Tiwari et al.

(10) Patent No.: US 12,613,914 B2
(45) Date of Patent: Apr. 28, 2026

(54) SYSTEM AND METHOD OF PROVIDING SEARCH AND REPLACE FUNCTIONALITY FOR VIDEOS

(71) Applicant: Microsoft Technology Licensing, LLC, Redmond, WA (US)

(72) Inventors: Nidhi Tiwari, Bangalore (IN); Chao Han, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 436 days.

(21) Appl. No.: 17/881,761

(22) Filed: Aug. 5, 2022

(65) Prior Publication Data

US 2024/0045904 A1     Feb. 8, 2024

(51) Int. Cl.
  *G06F 16/783*     (2019.01)
  *G06V 20/40*     (2022.01)
  *H04N 21/235*     (2011.01)
  *H04N 21/44*     (2011.01)

(52) U.S. Cl.
  CPC ............ *G06F 16/783* (2019.01); *G06V 20/46* (2022.01); *H04N 21/235* (2013.01); *H04N 21/44008* (2013.01)

(58) Field of Classification Search
  CPC ....... G06F 16/783; G06F 16/71; G06V 20/46; H04N 21/235; H04N 21/44008; G11B 27/036
  See application file for complete search history.

(56) References Cited

U.S. PATENT DOCUMENTS

| | | | | |
|---|---|---|---|---|
| 10,771,867 | B1 * | 9/2020 | Chemolosov ....... | G06F 16/7837 |
| 11,410,422 | B2 * | 8/2022 | He ........................ | G06N 3/084 |
| 2013/0086051 | A1 | 4/2013 | Brahms et al. | |

(Continued)

FOREIGN PATENT DOCUMENTS

| | | | | |
|---|---|---|---|---|
| CN | 111324768 A | * | 6/2020 | ........ G06F 16/7834 |
| WO | 2016098187 A1 | | 6/2016 | |
| WO | WO-2023039267 A1 | * | 3/2023 | ........... H04N 21/234 |

OTHER PUBLICATIONS

"International Search Report and Written Opinion Issued in PCT Application No. PCT/US23/027720", Mailed Date: Oct. 9, 2023, 11 Pages.

(Continued)

*Primary Examiner* — Vu Le
*Assistant Examiner* — Zaid Muhammad Saleh
(74) *Attorney, Agent, or Firm* — Novo TechIP International PLLC

(57) ABSTRACT

A system and method and for searching for an element in and replacement a portion of a video is conducted by retrieving the video and generating a video index for the video, the video index indexing a plurality of elements of the video such as text, audio and video. To search in the vide, a search query is received that includes at least one of a text element, an audio element, an image element, or a video element. Features and embeddings are extracted from the search query before comparing the search query features with the video index to identify a portion of the video that includes one of the text element, audio element, image element or video element of the search query. The identified portion is then automatically replaced with a replacement portion to generate a revised video.

18 Claims, 8 Drawing Sheets

(56) References Cited

U.S. PATENT DOCUMENTS

| | | | |
|---|---|---|---|
| 2014/0324845 A1* | 10/2014 | Bronstein | ............... G06F 16/13 |
| | | | 707/812 |
| 2015/0281595 A1 | 10/2015 | Zimmermann et al. | |
| 2016/0364397 A1* | 12/2016 | Lindner | ................ H04L 65/764 |
| 2021/0210119 A1* | 7/2021 | Jia | ......................... G06V 40/10 |

OTHER PUBLICATIONS

"Check spelling and perform find and replace operations", Retrieved from: https://helpx.adobe.com/premiere-pro/using/spelling-find-replace.html, Dec. 22, 2021, 8 Pages.

"Replace clips in Final Cut Pro", Retrieved from: https://web.archive.org/web/20220627042945/https://support.apple.com/en-gb/guide/final-cut-pro/ver4e2fcf0/mac, Jun. 27, 2022, 3 Pages.

"Replace footage", Retrieved from: https:/helpx.adobe.com/premiere-elements/using/replace-footage.html, Jan. 12, 2022, 3 Pages.

Hu, et al., "Reinforcement Learning to Rank in E-Commerce Search Engine: Formalization, Analysis, and Application", In Repository of arXiv:1803.00710v3, May 23, 2018, 10 Pages.

Sheremet, Oleksii, "Intersection over union (IoU) calculation for evaluating an image segmentation model", Retrieved from: https://towardsdatascience.com/intersection-over-union-iou-calculation-for-evaluating-an-image-segmentation-model-8b22e2e84686, Jul. 25, 2020, 6 pages.

Mu, et al., "All-but-the-Top: Simple and Effective Postprocessing for Word Representations", In Repository of arXiv:1702.01417v2, Mar. 19, 2018, 25 Pages.

Raunak, Vikas, "Simple and Effective Dimensionality Reduction for Word Embeddings", In Repository of arXiv:1708.03629v3, Nov. 21, 2017, 06 Pages.

* cited by examiner

600

605 BEGIN

610 RECEIVE A REQUEST TO SEARCH FOR A SEARCH QUERY IN A VIDEO

615 RETRIEVE THE VIDEO

620 GENERATE A VIDEO INDEX FOR THE VIDEO

625 GENERATE A SEARCH QUERY INDEX FOR THE SEARCH QUERY

630 COMPARE THE SEARCH QUERY INDEX WITH THE VIDEO INDEX TO IDENTIFY MATCHING VIDEO CLIP

635 REPLACE THE MATCHING VIDEO CLIP WITH A REPLACEMENTN PORTION TO GENERATE REVISED VIDEO

640 END

SYSTEM AND METHOD OF PROVIDING SEARCH AND REPLACE FUNCTIONALITY FOR VIDEOS

BACKGROUND

Digital videos are generated and used by many different users for a variety of purposes. While creating digital videos have been made easy with different types of easily accessible camera and video recording devices, editing an already generated video is often more complex. Moreover, the need for changing a video after it has been generated can arise for a variety of reasons. Yet, many of the users that generate digital videos are not skilled in video editing techniques. Furthermore, video editing is often a complex and time-consuming task. As a result, editing a video after it has been generated is often challenging for many users. This is particularly the case, when a specific portion or material in the video needs to be changed. For example, to modify a particular scene, a user would first need to identify where in the video the scene occurs. This may require the user to watch a lengthy video to identify the location. Subsequently, the user would need to utilize video editing tools to revise or remove the identified scene and insert a substitute scene at that location. This process is lengthy, requires manual intervention and necessitates video editing skills.

Hence, there is a need for improved systems and methods of efficiently editing digital videos.

SUMMARY

In one general aspect, the instant disclosure presents a data processing system having a processor and a memory in communication with the processor wherein the memory stores executable instructions that, when executed by the processor, cause the data processing system to perform multiple functions. The functions include receiving a request to search for a search query in a video, the search query being one of a text query, audio clip query, image query or video clip query, examining a plurality of elements of the video to identify a matching video clip within the video, the matching video clip being a video clip that includes one or more elements that match the search query, the plurality of elements including one or more of text, audio and video elements, automatically replacing the matching video clip with a replacement video clip to generate a revised video.

In yet another general aspect, the instant disclosure presents a method for searching for an element in and replacement a portion of a video. In some implementations, the method includes retrieving the video, generating a video index for the video, the video index indexing a plurality of elements of the video, the plurality of elements including text, audio and video, receiving a search query for searching the video, the search query including at least one of a text element, an audio element, an image element, or a video element, generating a search query index for the search query, comparing the search query index with the video index to identify a portion of the video that includes one of the text element, audio element, image element or video element of the search query, and replacing the identified portion of the video with a replacement portion to generate a revised video.

In a further general aspect, the instant disclosure presents a non-transitory computer readable medium on which are stored instructions that, when executed, cause a programmable device to perform multiple functions. The functions include receiving a request to search for a search query in a video, the search query being one of a text query, audio clip query, image query or video clip query, examining a plurality of elements of the video to identify a matching video clip within the video, the matching video clip being a video clip that includes one or more elements that match the search query, the plurality of elements including text, audio and video elements, automatically replacing at least a portion of the matching video clip with a replacement portion to generate a revised video, and providing the revised video for display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
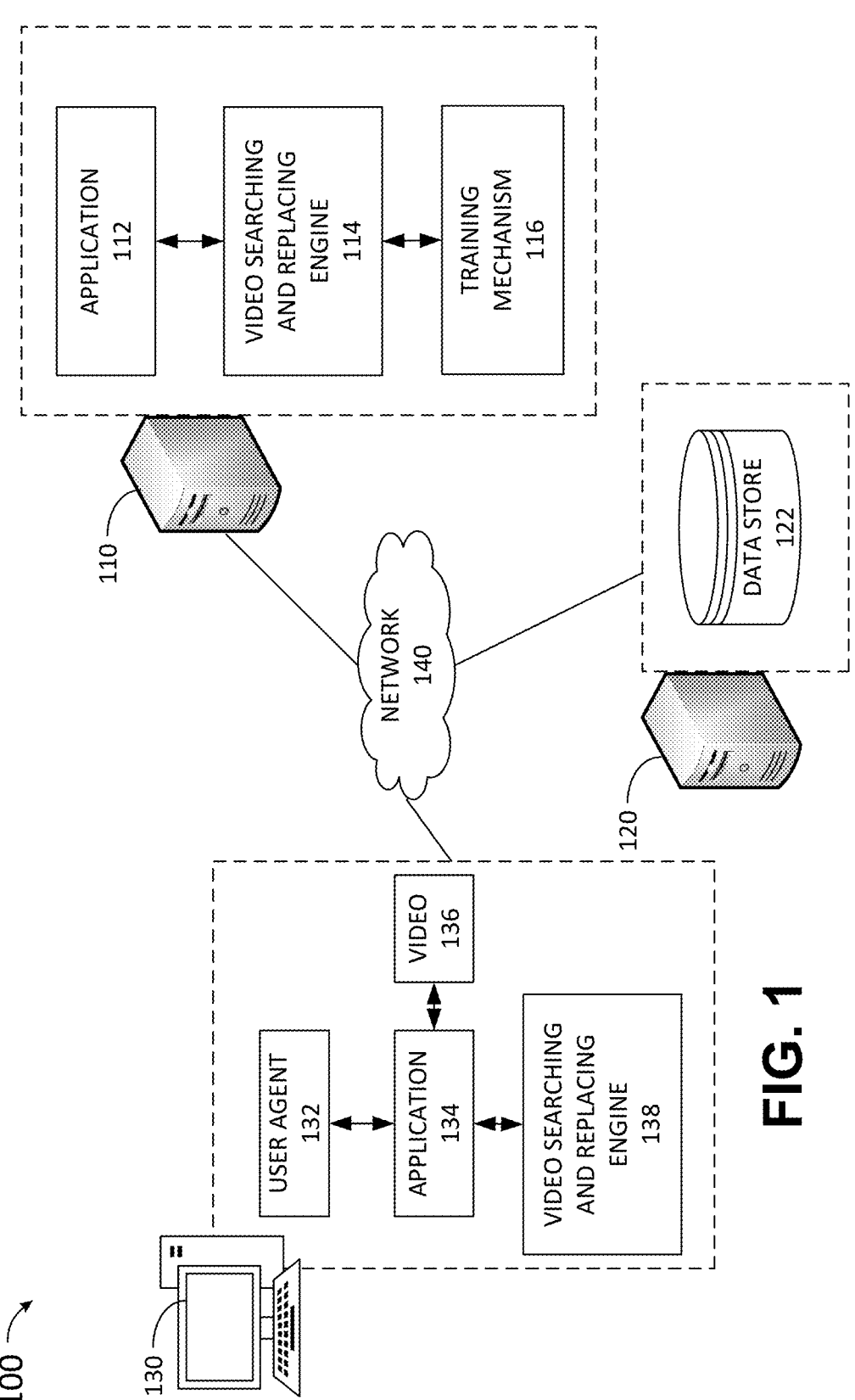
FIG. 1 depicts an example system upon which aspects of this disclosure may be implemented.

With the increased use of digital videos in many aspect of people's work and social life, the need for revising a portion of a video can arise in many different scenarios. Yet, making a minor change to a digital video can be a complex and time-consuming task that requires manual intervention, extensive time and video editing skills. Many times, a change can necessitate remaking of the video. For example, to change a product name after a marketing video has been generated, may require either regenerating the video or the work of a skilled video editor who would need to manually examine the video to identify and replace the portions that mention the product name. Thus, there exists a technical problem of lack of functionalities that enable a user to search for and replace content in a video.

To address these technical problems and more, in an example, this description provides technical solutions for intelligently creating a search index of elements in a video and providing a per element search and replace functionality for automatically identifying and replacing an element. To ensure elements such as text, audio and images can be identified, a video file is first parsed into individual clips and each video clip is examined to index the various elements. The index is then used when a search query for the video is received. The search query may include a text, audio, image and/or video segment. The query is then compared to the index to identify where in the video the query segment occurs. This may be achieved by using an intersection over union of different modes to find the correct matches. In some implementations, the identified matches are then presented to the user to enable the user to select which instances to replace. User selections may be stored and used in reinforcement learning to improve the efficiency and effectiveness of searching. To enable automatic replacement, the user provides the replacement text, audio, image or video segment. The technical solution then utilizes the provided replacement segment to automatically remove the identified matches and replace them with the replacement segment, while ensuring that the audio and timing elements are synched with the remainder of the video. In this manner, the technical solution provides an easy-to-use mechanism to search and replace various elements in a digital video. This significantly improves video editing functionality of current computing systems, improves video quality and increases user satisfaction.

The technical solution described herein addresses the technical problem of being able to identify and replace portions of a video efficiently by providing a system and method for automatically searching for and identifying elements of a video using a search query and automatically replacing the identified elements with user provided content. The technical solution automatically identifies elements of a video, thus saving substantia human time required for locating specific elements in a video. Furthermore, the technical solution automatically replaces a desired element with replacement content in an efficient manner while correctly synching the replaced portion with other portions of the video. This increases user efficiency, simplifies video editing procedures, and improves quality of revised digital videos. The technical effects at least include (1) improving the efficiency of using an electronic device to edit a video; (2) improving the process of identifying a searched for element in a video by indexing various elements of a video and utilizing the index to search for specific elements; and (3) improving the process of replacing video elements by automatically replacing an element with a replacement portion.

As will be understood by persons of skill in the art upon reading this disclosure, benefits and advantages provided by such implementations can include, but are not limited to, a technical solution to the technical problems of lack of mechanisms for efficient and user-friendly search and replacement functionality for digital videos. Technical solutions and implementations provided herein offer a mechanism for automatically detecting searched for elements in a video and automatically replacing an element with a replacement portion. The benefits made available by these technology-based solutions provide a user-friendly mechanism for automatically searching for and replacing portions of a video in an efficient and easy to use manner.

FIG. 1 illustrates an example system 100, upon which aspects of this disclosure is implemented. The system 100 includes a server 110, which itself includes an application 112, video searching and replacing engine 114 and a training mechanism 116. While shown as one server, the server 110 may represent a plurality of servers that work together to deliver the functions and services provided by each engine or application included in the server 110. The server 110 may operate as a cloud-based server for offering video editing services such as video search and replace functionalities in one or more applications such as application 112 and/or local application 134. The server 110 may also operate as a shared resource server located at an enterprise accessible by various computer client devices such as a client device 130.

The server 110 includes and/or executes a video searching and replacing engine 114, which receives a request to search for an element in a given video and replace the element with a replacement content. The request is received from an application such as the application 112 or 134. The searching and replacing engine 114 processes the request by searching for the element in a video index associated with the video, as described in further detail below with respect to FIG. 2. Once the desired elements are identified in the video, the video searching and replacement engine 114 may provide data related to the identified elements to the application 112 or 134 for display to a user (e.g., the requesting user). In response, the user may select one or more of the identified elements to be replaced with a replacement content. Alternatively, the once the elements are identified, the video searching and replacing engine 114 may simply replace the identified elements with the replacement content provided. The replacement process may involve removing the identified element (e.g., image, video clip, text, etc.) and replacing it with a replacement content that is provided by the user. The process of indexing the video, searching for the elements in the indexed video, and/or replacing an identified element may involve use of one or more machine-learning (ML) models. The internal structure of and data flow between the various elements of the video searching and replacing engine 114 are discussed in greater detail with respect to FIG. 2.

One or more ML models implemented by the video searching and replacing engine 114 are trained by the training mechanism 116. The training mechanism 116 uses training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. The initial training is performed in an offline stage. Additionally, and/or alternatively, the one or more ML models may be trained using batch learning.

As a general matter, the methods and systems described herein include, or otherwise make use of one or more ML model to perform video and/or image processing to parse a video file into separate video clips, detect text and/or objects in an image and/or video, create an index for a video file, perform text to speech processing, search for elements in a video index and/or replace a video portion. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activities, determine associations between various words and users, and identify keywords and/or classify content. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data is occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care is taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 includes a server 120 which is connected to or includes the data store 122 which may function as a repository in which databases relating to training models, video indexing data and/or video files stored. Although shown as a single data store, the data store 122 is representative of multiple storage devices and data stores which are accessible by one or more of the video searching and replacing engine 114, training mechanism 116, and applications 112/134.

The client device 130 is connected to the server 110 via a network 140. The network 140 can be a wired or wireless network(s) or a combination of wired and wireless networks that connect one or more elements of the system 100. The client device 130 is a personal or handheld computing device having or being connected to input/output elements that enable a user to interact with various applications (e.g., application 112 or application 134) that allow the user to generate and/or edit a video. Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 7 and 8.

The client device 130 includes a local application 134. The application 134 is a computer program executed on the client device that configures the device to be responsive to user input to allow a user to generate, view and/or edit a video such as the video 136. Examples of suitable applications include, but are not limited to, a presentation application (e.g., Microsoft PowerPoint), and a communications application or any video editing application. The application 134 is connected to or includes a local video searching and replacing engine 138. The local video searching and replacing engine 138 includes similar elements and functions in a similar manner as the video searching and replacing engine 114 to provide local video searching and replacement services. The video 136 is representative of any video file (e.g., MP4, MPEG-4, MOV, WMV, AVI, FLV, WebM, etc.). The video 136 is stored locally on the client device 130. Alternatively, the video 136 is stored remotely on a remote storage device such as the data store 122.

In some examples, the application used to participate in an online meeting is executed on the server 110 (e.g., application 112) and provided via an online service. In some implementations, web applications communicate via the network 140 with a user agent 132, such as a browser, executing on the client device 130. The user agent 132 may provide a user interface (UI) that allows the user to interact with the application 112. User data from the application 134 or application 112 is provided via the network 140 to the video searching and replacing engine 114 for use in providing video search and replacement services. It should be noted what while, the video searching and replacing engine 114 is shown as a separate from the application 112, the video searching and replacing engine 114 may be include in the application 112.

Figure 2:
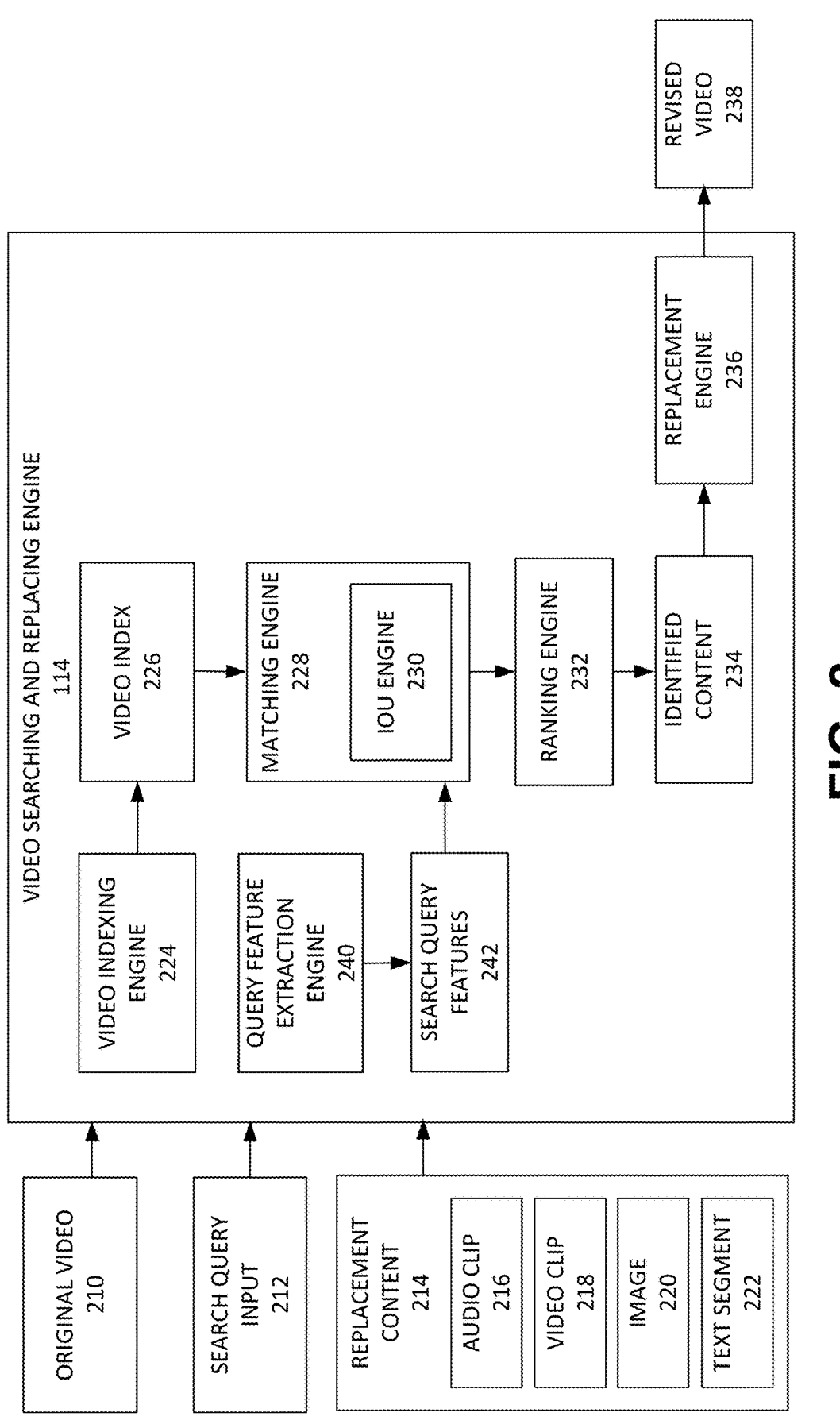
FIG. 2 depicts an example of some of the elements of a video searching and replacing engine.

FIG. 2 depicts an example of some elements used in a video searching and replacing engine. The video searching and replacing engine 114 includes a video indexing engine 224, matching engine 172, and ranking engine 232, and replacement engine 236. In some implementations, a request to search for and replace an element of a video is received by the video searching and replacing engine 114 when a user submits a request for search and replacement via a UI element of an application such as the applications 112/134 of FIG. 1.

The request for searching and replacing a video element may include the original video 210 for which searching is requested. In some implementations, the request includes an identifier for the video 210 that enables the video searching and replacing engine 114 to search for index data for the video 210 in a storage medium, as further discussed below. The original video 210 may be a video being viewed and/or edited via the applications 112/134. The request also includes a search query input 212 which contains an element the user is interested in searching for in the video 210. The element may be a text portion (e.g., a word or phrase such as a product name), an audio component, an image (e.g., a presentation slide or marketing flyer), and/or a video clip. The audio component can be an audio recording of a word or phrase. For example, an audio recording of an inappropriate word or a product name that needs to be removed from the original video 210. The video clip may be a video file containing a video segment (e.g., a scene) which the user believes is included in the original video 210 and is interested in locating in the video. The requesting user can provide the search query input 212 via a UI element of the application from which the search request is submitted. For example, the UI element enables the user to enter a text query or upload a file such as an image file, audio file or video file as query.

In addition to the search query input 212, the user also provides a replacement content 214 to enable search and replacement. The replacement content 214 can be one of an audio clip 216, video clip 218, image 220 or text segment 222. For example, when a product name that is included in the audio portion of the original video 210 needs to be changed, the user submits a text or audio query containing the old product name as the search query for identifying the locations in the video where the old product name is mentioned. The user also submits a replacement audio clip 216 containing the new product name for replacing the product name in the audio portion of the video 210. This enables the video searching and replacing engine 114 to replace the old product name with the new product name, as further discussed below. In another example, where a slide used in the original video 210 needs to be changed (e.g., original video is a presentation video), the user submits the original slide as a search query input 212 and submits the new slide as replacement image 220. Similarly, when the user desires to replace a scene or other video portion of the original video 210 with a new video portion, the user submits the new video portion as the video clip 218. A text segment 222 is submitted as a replacement, when the user is interested in changing a phrase in the audio and/or video. This could be a spoken phrase or one that is written in one or more of the video frames (e.g., it is included in one of the slides in a video presentation).

Upon receiving the request for search and replacement, the video searching and replacement engine 114 generates a video index 226 of the original video 210 via the video indexing engine 224. The internal structure and operations of the video indexing engine 224 are discussed in greater detail with respect to FIG. 3. The video index 226 contains an index of various different elements of the original video such as text, audio, image, objects in each frame and the like. The search query input 212 is transmitted to the query feature extraction engine 240 to extract features, descriptors, embeddings and the like from the search query 212. The query index feature extraction engine 240 may include one or more ML models and functions to extract features from the search query input 212 that can be used in comparing with the video index. Depending on the type of search query input (e.g., text, audio, image, video, etc.), different types of features and embeddings may be extracted/generated from the search query input 212. The extracted features, descriptors and embeddings are provided as search query features 242 to the matching engine 228.

In this manner, the matching engine 228 which receives the video index 226 and the search query features 242 can compare the index to the search query features 242 to identify portions of the original video 210 that match with the search query. Because the video index 226 and the search query features 242 are similarly formatted, the matching engine 228 can operate quickly and efficiently to identify matching video portions in the original video 210. In some implementations, the matching engine 228 utilizes an intersection over union (IOU) engine 230 to identify the correct matches. As discussed in greater detail with respect to FIG. 4, the IOU engine 230 uses an IOU of different modes to find the matching portions.

In some implementations, the identified video portions are transmitted to a ranking engine 232 to be ranked according to one or more parameters. The ranking engine 232 may include one or more ML models that rank the identified portions based on user contextual data such as user specific data collected and analyzed for each user. In an example, the ranking engine 232 uses user feedback data such as data collected from previous search and replacement operations conducted by the user to train the ranking engine 232. For example, each time the user indicates that an identified content portion should be replaced, the algorithm stores that data as positive feedback data indicating that the identified portion was correctly identified. Similarly, when the user chooses to ignore an identified portion instead of replacing it, the algorithm flags that identification as incorrect and stores data relating to that identification such that similar identifications are not made in the future for that user. In some implementations, in addition to contextual data for the same user, user contextual data from other users who are similar to the user or from a global library of users is used to train and update the ML models used in ranking. The ranking engine 232 ranks the identified portion based on a confidence score that indicates whether each identified portion is likely to be a match for the user query. A top percentage or number of the ranked identified portions are then selected by the ranking engine 232 or the matching engine 228 as the identified content 234. In some implementations, the ranking engine 232 operates with and as part of the matching engine 228.

The identified content 234 may be transmitted to the application from which the request was submitted for display to the user. For example, once the query is submitted by the user and the identified content 234 is detected, the video searching and replacing engine 114 transmits the identified content 234 to the application which then displays the identified content 234 to the user. The application may provide a playback screen of the original video 210 with the identified content 234 being flagged. For example, the application uses visual indicators on a temporal bar associated with the video to mark the portions of the original video that correspond with the identified content 234. In an example, this is achieved by marking the portions of the original video 210 that are identified as corresponding with the search query. For example, if the video clip from the 1 minute, 30 seconds to the 1 minute, 38 seconds of the original video 210 corresponds with the search query, a visual cue is used to mark the time period between 1:30 and 1:38 as matching with the search query. In some implementations, the user can utilize a UI element such as a "Next" menu option to move between the identified content 234 in the original video 210. The UI element may take the user to the beginning of the next identified video clip in the original video 210. This enables the user to review each identified content 234 to decide whether it was correctly identified and if so to choose to replace the identified content 234.

When reviewing the identified content 234, the user may utilize a "Replace" menu option to replace each identified content 234. Alternatively, upon identifying the identified content 234, the video searching and replacing engine automatically replaces each identified content 234 with the replacement content 214. Once a request to replace an identified content 234 is received (e.g., either from the user or automatically generated), the video searching and replacing engine 114 transmits the identified content 234 and the replacement content 214 to the replacement engine 236 for replacing the identified content 234 with the desired replacement. Depending on the type of replacement content 214 provided, the replacement engine 236 utilizes an algorithm such as an ML model to replace the identified content 234 with the replacement content 214. When the replacement content 214 is a video clip 218, the replacement engine 236 removes the identified content 234 and inserts the video clip 218 in its place in the original video 210 by stitching the video clip 218 in the location in the video where the identified content 234 was located. During this process, the replacement engine 236 ensures that audio portion of the video is synched properly with the replacement video clip 218 such that the revised video has a seamless audio. Moreover, the replacement engine 236 takes temporal considerations into account such that once the video clip is replaced, the revised video does not appear choppy or disjointed. This may be done by taking temporal and audio elements into account when parsing the original video 210 into video clips, as further discussed below. Stitching of the replacement video clip 218 into the original video 210 is performed in accordance with known video editing techniques.

When the replacement content is an audio clip 216, the identified content 234 (video clip) is parsed into video and audio components and the replacement audio clip 216 is interposed over the video component or the identified content 234 in accordance with known audio/video editing techniques to generate a new video clip that displays the previous images but includes the new audio clip 216. If the length of the audio clip 216 is different from the length of the identified content 234 (e.g., video clip is 5 seconds, while the audio clip 216 is 2 seconds), an ML model or logic-based algorithm is used to examine the video clip and only replace the audio for a portion of the video clip that corresponds with the timing and/or content of the replacement audio clip 216. Furthermore, silence detection may be employed to ensure that words are not interrupted by the replacement.

Replacing an image 220 in the identified content 234 involves removing a video frame from the original video 210 and replacing the frame with the image 220. When the identified content 234 includes audio, this process includes retaining the original audio such that only the image is replaced in the video file. When the replacement content is a text segment 222, the replacement engine 236 utilizes an ML model or other type of algorithm that identifies the portion of the identified content 234 which corresponds with the text segment 222 and replaces that portion. For example, if the identified content 234 is video frame, the replacement engine 236 identifies the object (e.g., based on search query input) within the video frame that needs to be replaced with the text segment 222. In some implementations, the replacement engine 236 detects the font and/or other formatting parameters of the original text and applies the formatting to the replacement text segment 222 before the text is replaced, such that the replacement text 222 fits well with the original video 210 and does not seem out of place. Once all of the required identified content 234 is replaced with replacement content 214, the replacement engine 236 finalizes the video to generate the revised video 238. The revised video 238 is provided as an output by the video searching and replacing engine 114. The revised video 238 may be transmitted to the application from which the request was received to enable the user to review the changes, before saving the revised video 238.

Figure 3:
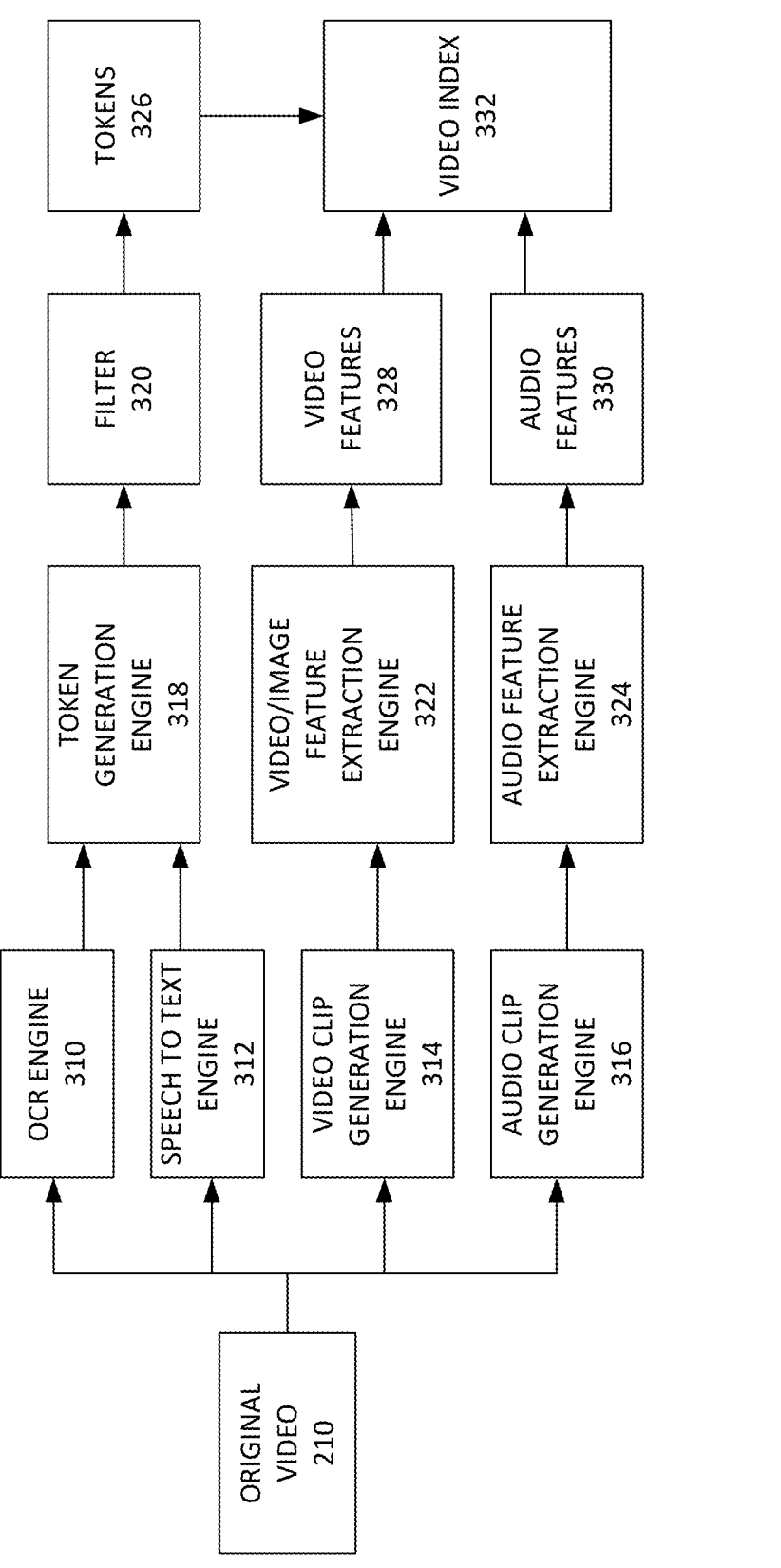
FIG. 3 depicts an example of elements and flow of data between elements used in a video indexing engine.

FIG. 3 depicts an example of elements and flow of data between elements used in a video indexing engine such as the video indexing engine 224 of FIG. 2. The video indexing engine 224 receives a video such as the original video 210 as an input and provides a video index as the output. In some implementations, the indexing process occurs in real time, when a request for searching a video is received. In other implementations, the indexing process occurs when a video is generated, stored, or uploaded. For example, an application for video generation may create a queue for indexing of video files when new videos are generated and saved. In an example, the videos in the video queue are indexed during time periods when fewer processing resources are needed for other tasks, for example, late at night or early morning. In this manner, video indexing is performed in an efficient manner such that minimal processing and time is required both for indexing and when a request for search and replacement is received.

To index the original video 210, the video indexing engine makes use of an optical character recognition (OCR) engine 310 to convert characters presented in the video 210 to text. The OCR engine 310 may be any OCR engine known in the art that can recognize characters in images and/or video frames. In this manner, character or text present in the video 210 is identified and used for indexing. In addition to the using the OCR engine 310, the video indexing engine utilizes a speech to text engine 312 for converting speech in the audio portion of the video 210 to text. This involves use of a known speech to text algorithm that analyzes the audio portion of the video 210 to convert the speech in the audio to text. The converted text is then used in the indexing process.

The text identified by the OCR engine 310 as well as the text recognized by the speech to text engine 312 is transmitted to a token generation engine 318 to generate tokens based on the text. The token generation engine 318 may use token generation techniques known in the art to create tokens from the identified text. The process may involve use of a whitespace tokenizer that breaks text into tokens (terms), when it encounters a whitespace character. In this manner, stings of text can be turned into tokens that are then used to create an index. The tokens identified by the token generation engine 318 are transmitted to the filter 320 to filter out terms or characters that are not likely useful in the indexing process. In some implementations, the filter 320 includes a stop-word filter that removes words that are not likely to be keywords. Stop-words include terms such as the, a/an, is/are, was/were, to/of and the like. The filter 320 may also include a filter that removes special characters such as periods, exclamation marks, question marks and the like. Another filter may remove numbers. Once the filter 320 removes unnecessary terms and characters, the results are provided as a list of tokens 326 which can be used to generate the final video index 332. The tokens 326 includes a list of tokens (e.g., terms) extracted from the video 210 as well as information indicating a video frame or timestamp at which each token appears in the video.

The original video 210 is also provided to a video clip generation engine 314 to parse the video file into individual video clips. This is done so that individual video clips can be indexed and used in searching and replacement. To ensure video clips are generated such that replacement can occur efficiently and accurately, the video clip generation engine 314 conducts a spatio-temporal analysis to generate the video clips. In some implementations, this is done by using ML or deep learning models that identify major changes in video (i.e., in sequence of frames). For instance, the models can identify movement of an object or changes in scene. This involves ensuring that the video clips are generated such that individual words are not split into two different video clips and may include synchronization with the audio clip generation engine 316 that generates the audio clips associated with each video clip. The audio clip generation engine 316 performs silence detection and/or speaker identification to generate the audio clips such that parsing occurs during silent portions (e.g., portions of the audio where there is no speaking). This ensures that the spoken words are not chopped off during the video clips. Silence detection may be performed by using an ML model or other algorithm that analyzes audio data to detect types of sound. The audio clip generation engine 316 and video clip generation engine 314 function with each other to generate video clips and audio clips that correspond with each other.

The generated video clips are transmitted to a video/image feature extraction engine 322. The video/image feature extraction engine may include one or more ML models that are trained to extract features from video clips and/or images within a video clip. Extracted features include objects that are present in a video frame and/or image. For example, the video/image feature extraction engine 322 may examine a video frame, and recognize and/or extract animals, household objects, faces, vehicles and the like that are present within that video frame The recognized features is used to generate a list of video features 328. The list includes the identified features, the video clip in which each identified feature was detected and/or the location (e.g., temporal location and/or positional location within the frame) at which the identified feature is located within the video clip. The list of video features may include one or more features for each video clip generated by the video clip generation engine 314.

The generated audio clips are transmitted to the audio feature extraction engine 324, which examines each audio clip to extract audio features associated with each audio clip. The audio features examined and extracted may include pitch, frequency, volume, as well as inferred parameters such as the source of an audio (e.g., person talking, musical instrument, alarm, etc.), the number of speakers speaking in the audio clip and the like. The extracted audio parameters are used to generate the video index 332. Furthermore, the extracted audio parameters may be used when replacing a video clip to ensure that the replacement has similar audio parameters to that of the original video file such that there is no sudden change in volume of the audio and the like. The extracted audio features are used to generate a list of audio features 330, which includes the extracted audio features for each audio clip. The tokens 326, video features 328 and audio feature 330 are then used to generate a combined video index 332. The combined video index 332 may include a video clips index, an audio clips index and a text segment index. The three indices may be separate but combined together in one data structure to form the video index 332. Thus, the video index 332 is an inverted index that contains an index of multiple various parameters associated with each video clip of the original video 210. This video index 332 can then be used to perform a quick search for text, images, audio clips and/or video clips in the original video 210.

Figure 4:
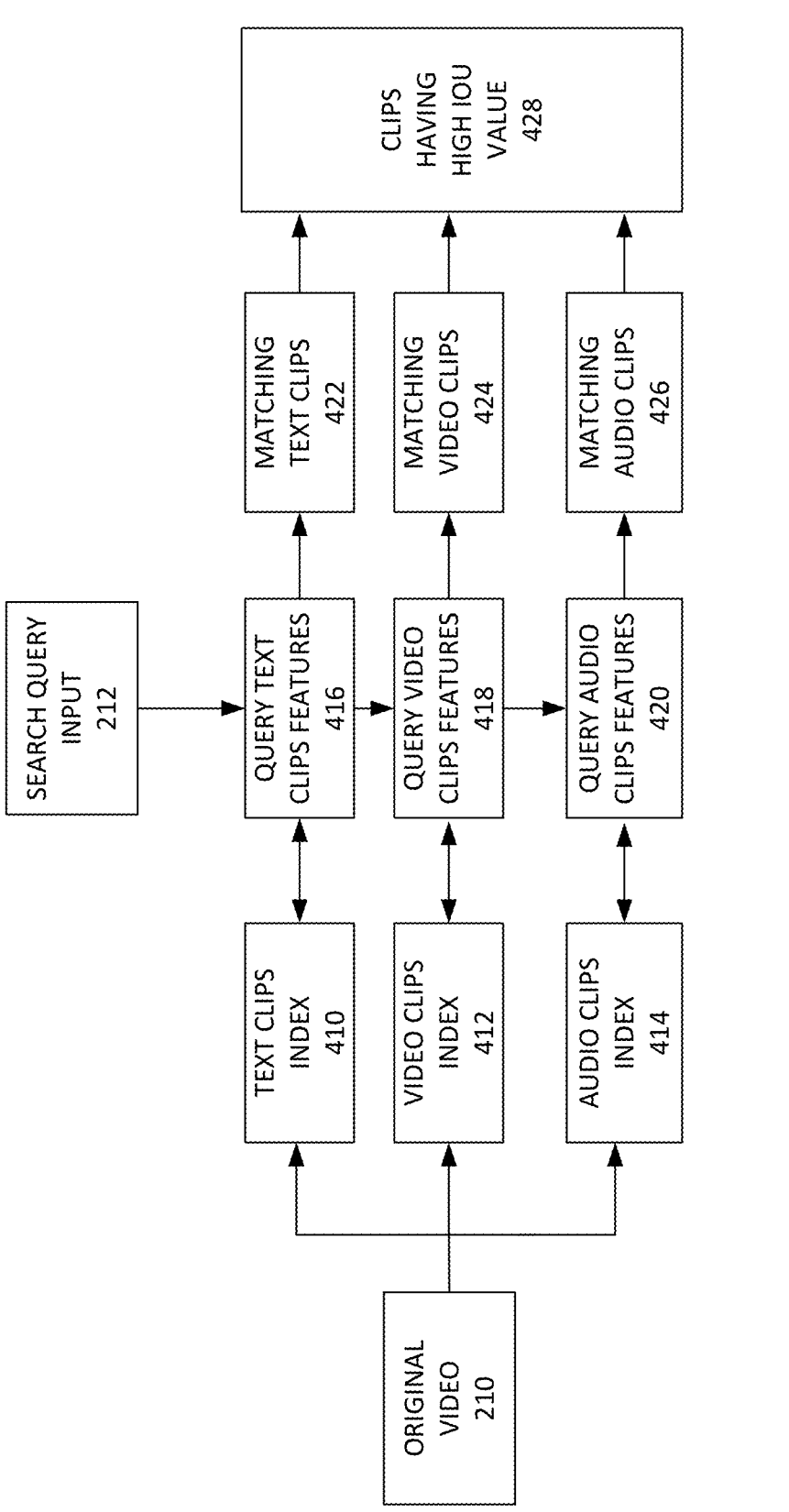
FIG. 4 depicts an example of elements and flow of data between elements for performing intersection over union.

FIG. 4 depicts an example of elements and flow of data between elements for performing intersection over union. Once the original video is submitted and undergoes pre-processing, various indices are generated based on the original video 210. The indices include a text clips index 410, video clips index 412, and audio clips index 414. These indices are generated as discussed above, with respect to FIG. 3. Similarly, the search query input 212 undergoes a feature extraction/index generation process to generate a query text clips features 416, a query video clips features 418 and a query audio clips features 420.

After features of the search query are extracted, corresponding text, video and audio features/indices of the search query and the video 210 are compared against each other to identify matching text clips 422, matching video clips 424 and matching audio clips 426. The matching text clips 422 includes a list of matching time sorted text clips, while the matching video clips 424 includes a list of matching time sorted video clips and the matching audio clips 426 includes a list of matching time sorted audio clips. An IOU of the matching text clips 422, matching video clips 424 and matching audio clips 426 is then calculated to identify clips having high IOU values 428. In some implementations, this is achieved by examining that matching clips to identify for each interval of a video clip in the matching video clips 424, overlapping (interval) clips in audio and text interval clips. This may be done by calculating, for each interval in the video clips, the IOU in terms of time intervals where there is an intersection between audio, video and text. Once the IOUs are calculated, the video clips with the highest IOU values are selected as matching video clips.

Furthermore, IOU is used remove duplicate bounding boxes for the same object. To achieve this, the matching clips are sorted in descending order of their confidence. If two bounding boxes are pointing to the same object, their IOU would be high. In this case, the bounding box with the higher confidence (i.e., the first box) is selected and the other boxes having lower confidence scores are rejected. When the IOU is low, this could result in two bounding boxes pointing to different objects of the same class such as different dogs or different cats in the same image.

Figure 5:
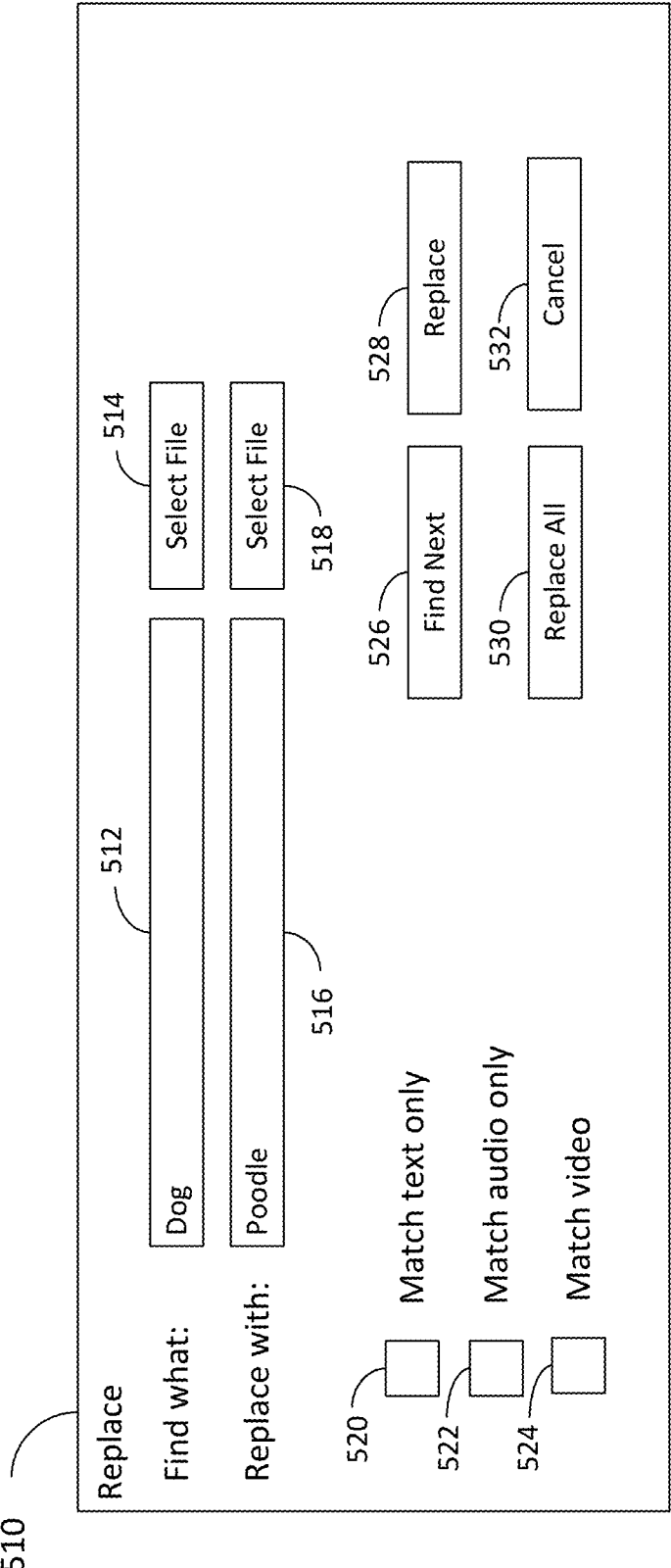
FIG. 5 depict an example user interface (UI) element displayed by an application or service that provides video search and replacing functionalities.

FIG. 5 depict an example UI element displayed by an application or service that provides video search and replacing functionalities. The UI element 510 is displayed by a video editing application when a request to search for an element in a video is received. In an example, the UI element 510 is displayed, when a user viewing and/or editing a video file invokes a menu option for search and/or replace in the video.

The UI element 510 includes an input box 512 to enable the user to enter a text query for searching. Alternatively, the menu option 514 may be utilized to select a file as the search query. Upon selection of the menu option 514, a browsing window may be displayed that enables the user to select a file. The selected file can be an image, an audio file or a video file. Once selected, the file name may be displayed in the input box 512. The selected file is then used as the search query for searching the video once searching begins.

The UI element 510 also includes an input box 516 for entering a replacement content that can be used to replace portions of the video identified in the search. The replacement content can be text which is entered directly in the input box 516. Furthermore, replacement content can be submitted by utilizing the menu option 518 to select a file. The replacement file can be an image, audio file or video file. Once selected, the replacement file is used when the user confirms that replacement is desired.

After a search query has been entered or a search file has been selected, the user can utilize the menu option 526 to find the next occurrence of the search query in the video file. Once invoked, when a video clip is identified as matching the search query, the matching video clip is displayed on the graphical user interface of the application. In some implementations, the UI element 510 is overlayed on the graphical user interface, such that the user can utilize the menu option 526 to move to the next occurrence of the search query in the video. The user may also utilize the menu option 528 to replace an identified match with the replacement content. Furthermore, all matching video clips can be replaced by utilizing the menu option 530 to replace all. The cancel menu option 532 may be used to cancel the search and/or replacement operations. In some implementations, additional features are provided by enabling the user to choose to search for only text by checking the check box 520, search for only audio by checking the check box 522 or match just video by selecting the check box 524.

Figure 6:
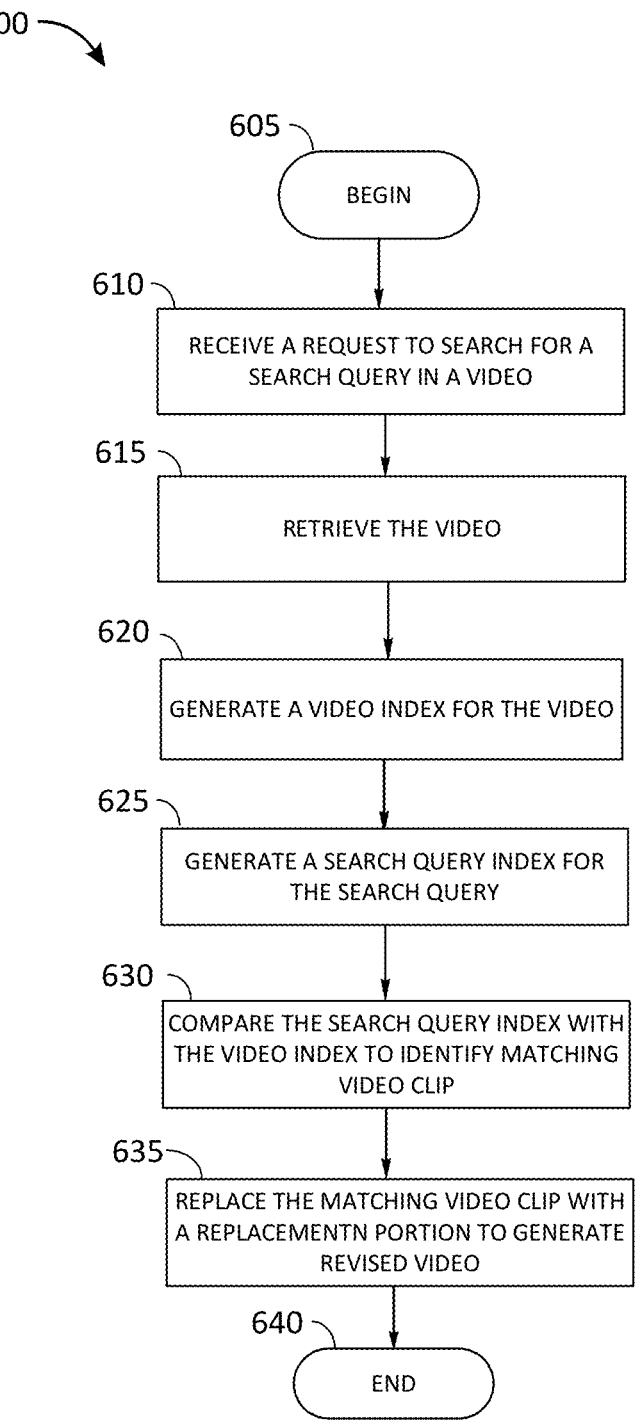
FIG. 6 is a flow diagram depicting an example method for conducting a search in and replacing a portion of a video.

FIG. 6 is a flow diagram depicting an example method for conducting a search in and replacing a portion of a video. One or more steps of the method 600 may be performed by a video searching and replacing engine such as the video searching and replacing engine 114 of FIGS. 1-2 or by an application such as applications 112/134 of FIGS. 1A-1B. The method 600 may begin, at 605, and proceed to receive a request to search for a search query in a video, at 610. This may occur, for example, when a user editing a video submits a request for finding an element in the video. The request can be submitted via a UI of an application used to edit the video. The request includes the search query, which may include one of a text query, audio query, image query or video clip query.

After receiving the request, method 600 proceed to retrieve the video, at 615. In some implementations, the video is provided with the request to search the video. In other implementations, the video is already available to the search and replacing engine and as such does not need to be retrieved. Once the video is available, method 600 proceed to generate a video index for the video, at 620. The video index is generated by examining various elements of the video such as text, audio, image, and video. The indexing process includes parsing the video into multiple smaller video clips and their corresponding audio clips. The indexing process also involves performing OCR of images within the video and/or conducting speech to text conversion to generate text which is then used for indexing.

In addition to generating an index for the video, method 600 also generates a search query index for the search query, at 625. The search query index is generated in a similar manner and a similar format as that of the video index such that similar elements of the search query index and video index can be compared to identify matching video clips, at 630. The matching video clips would be portions of the video that include elements present in the search query. The elements may be text, audio, objects or a video portion.

Once the matching video clip(s) are identified, method 600 proceed to replace the matching video clip with a replacement portion to generate a revised video, at 635. This may require receiving the replacement portion. For example, the replacement portion can be provided with the search request or later by the user. The replacement portion may be one of a text segment, an audio clip, an image or a video clip. Replacing the replacement portion may involve synching temporal and audio elements of the replacement portion with the remainder of the video to ensure the replacement portion fits well within the revised video. Once the revised video is generated, the method 600 ends, at 640. In some implementations, the revised video is transmitted to the application from which the request was received and provided for display to the user.

Figure 7:
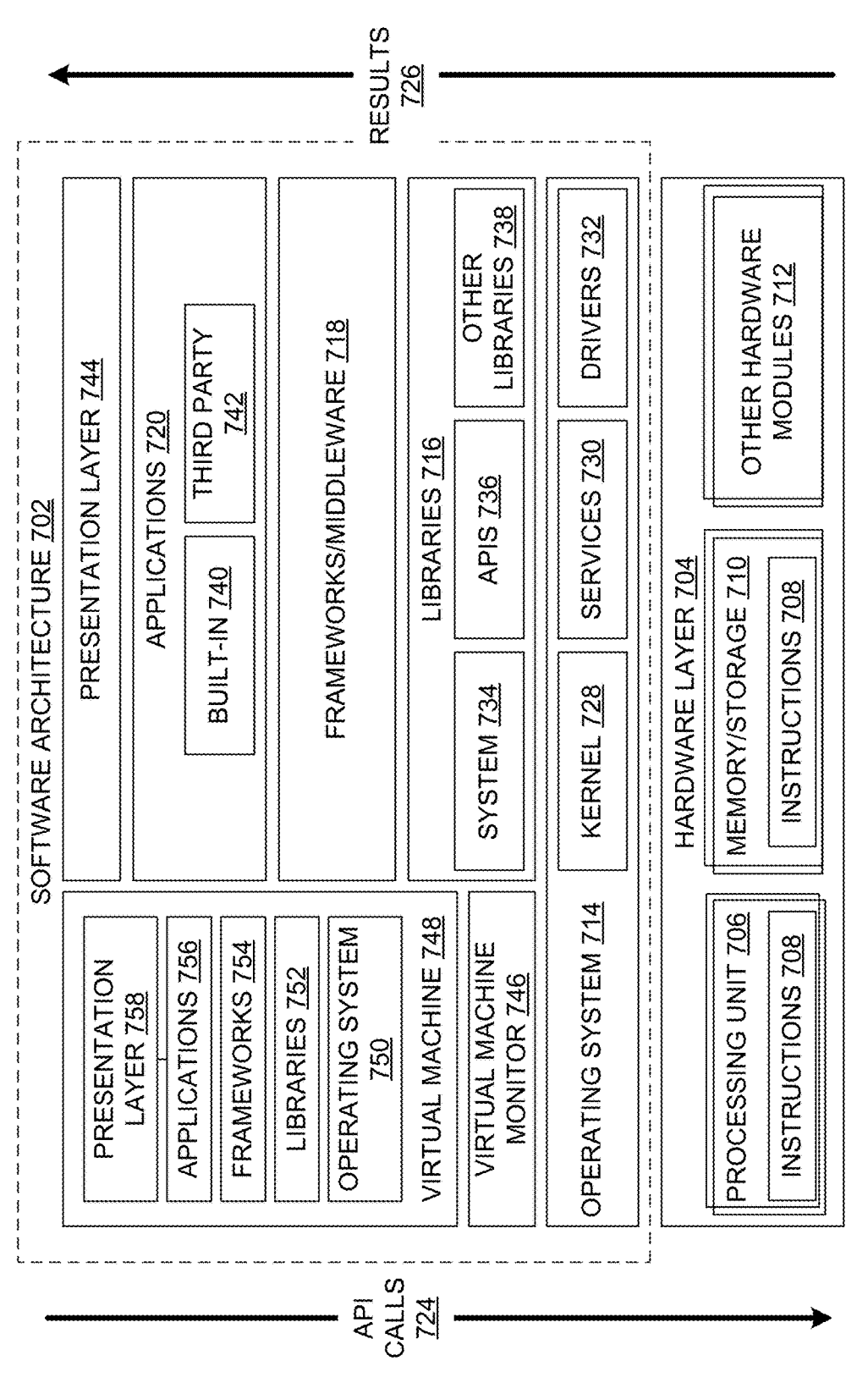
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine depicted in block diagram 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
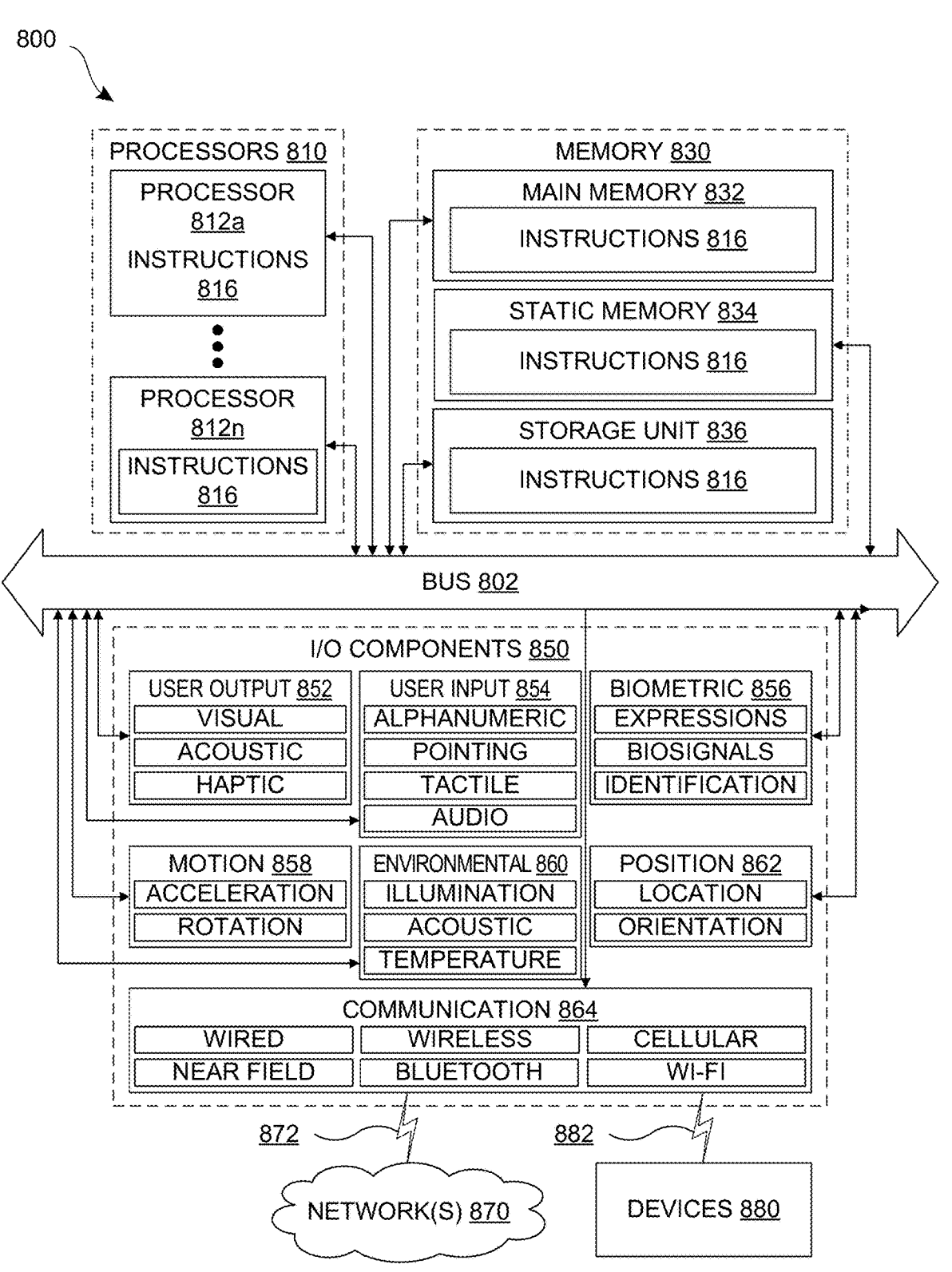
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers). The motion components 858 may include, for example, motion sensors such as acceleration and rotation sensors. The environmental components 860 may include, for example, illumination sensors, acoustic sensors and/or temperature sensors.

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-8) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
    a processor; and
    a memory in communication with the processor, the
        memory comprising executable instructions that,
        when executed by the processor, cause the data
        processing system to perform functions of:

receiving a request to search for a search query in a video, the search query being one of a text query, audio clip query, image query or video clip query;

examining a plurality of elements of the video to identify a matching video clip within the video, the matching video clip being a video clip that includes one or more elements that match the search query, the plurality of elements including one or more of text, audio and video elements;

automatically replacing the matching video clip with a replacement video clip to generate a revised video.

Item 2. The data processing system of item 1, wherein the executable instructions, when executed by the processor, further cause the data processing system to perform functions of:

receiving a user request to replace the matching video clip with the replacement video clip, the user request including the replacement video clip; and automatically replacing the matching video clip with the replacement video clip in response to receiving the user request.

Item 3. The data processing system of items 1 or 2, wherein the request includes the search query and the replacement video clip.

Item 4. The data processing system of any preceding item, wherein the executable instructions, when executed by the processor, further cause the data processing system to perform functions of:

generate a video index for the video, the video index including a text index, an audio clip index and a video clip index;

extract features from the search query; and compare the video index with the extracted features of the search query to identify the matching video clip.

Item 5. The data processing system of item 4, wherein intersection over union of different elements is used to identify the matching video clip.

Item 6. The data processing system of item 4, wherein the executable instructions, when executed by the processor, further cause the data processing system to perform functions of generating a plurality of video clips from the video before generating the video index.

Item 7. The data processing system of any preceding item, wherein the executable instructions, when executed by the processor, further cause the data processing system to perform functions of:

providing the matching video clip for display in a user interface element;

receiving one of a selection of the matching video clip for replacement or a user input for ignoring the matching video clip; and storing data related to the selection or the user input for use in training machine-learning models that identify the matching video clip.

Item 8. A method for searching for an element in a video and replacing a portion of the video comprising:

retrieving the video;

generating a video index for the video, the video index indexing a plurality of elements of the video, the plurality of elements including text, audio and video;

receiving a search query for searching the video, the search query including at least one of a search query text element, a search query audio element, a search query image element, or a search query video element;

comparing a feature of the search query with the video index to identify the portion of the video that includes one of the search query text element, search query audio element, search query image element, or search query video element; and replacing the identified portion of the video with a replacement portion to generate a revised video.

Item 9. The method of item 8, wherein generating the video index includes:

parsing the video into a plurality of video clips;

parsing an audio portion of the video into a plurality of audio clips;

extracting text from the video;

using a first machine-learning (ML) model to extract video features from the plurality of video clips;

using a second ML model to extract audio features from the plurality of audio clips; and generating the video index from the extracted text, extracted video features and the extracted audio features.

Item 10. The method of item 9, wherein extracting text from the video includes:

utilizing optical character recognition to extract text from images within the video;

utilizing speech to text conversion to convert spoken words within the audio portion of the video to text;

generate tokens from the extracted text; and filter the tokens to generate a text index.

Item 11. The method of item 9, wherein the video is parsed into the plurality of video clips based on temporal scene differences.

Item 12. The method of item 9, wherein the audio is parsed into the plurality of audio clips based on at least of one silence detection and detection of speakers.

Item 13. The method of any of items 8-12, wherein replacing the identified portion of the video with a replacement portion includes automatically synching an audio of the video with the audio of the replacement portion.

Item 14. The method of any of items 8-13, wherein replacing the identified portion of the video with a replacement portion includes automatically synching a timing of the video with a timing of the replacement portion.

Item 15. The method of any of items 8-14, wherein the replacement portion is received via a user interface element.

Item 16. A non-transitory computer readable medium on which are stored instructions that, when executed, cause a programmable device to perform functions of:

receiving a request to search for a search query in a video, the search query being one of a text query, audio clip query, image query or video clip query;

examining a plurality of elements of the video to identify a matching video clip within the video, the matching video clip being a video clip that includes one or more elements that match the search query, the plurality of elements including text, audio and video elements;

automatically replacing at least a portion of the matching video clip with a replacement portion to generate a revised video; and providing the revised video for display.

Item 17. The non-transitory computer readable medium of item 16, wherein the instructions when executed further cause the programmable device to perform functions of:

receiving a user request to replace the matching video clip with the replacement video clip, the user request including the replacement video clip; and automatically replacing the matching video clip with the replacement video clip in response to receiving the user request.

Item 18. The non-transitory computer readable medium of items 16 or 17, wherein the request includes the search query and the replacement video clip.

Item 19. The non-transitory computer readable medium of any of items 16-18, wherein the instructions when executed further cause the programmable device to perform functions of:

generating a video index for the video, the video index including a text index, an audio clip index and a video clip index;

extracting features from the search query; and comparing the video index with the extracted features of the search query to identify the matching video clip.

Item 20. The non-transitory computer readable medium of any of items 16-19, wherein the video index is generated by using one or more machine-learning models.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory in communication with the processor, the memory comprising executable instructions that, when executed by the processor, cause the data processing system to perform functions of:

receiving, from a user, a request to search for specified content in a video, the specified content being one of first input text, a first audio file, a first image file or a first video file;

presenting, to the user, a user interface (UI) element for loading any of the first input text, the first audio file, the first image file or the first video file to identify the specified content, the UI element also accepting from the user any of a second input text, a second audio file, a second image file or a second video file as replacement content corresponding to the specified content for replacing the specified content in the video;

generating an index of different elements in the video by frame;

operating one or more machine-learning (ML) models to identify a matching video clip within the video, the matching video clip being a video clip that includes one or more elements that match the specified content, the one or more elements including one or more of text, audio and video elements, the one or more ML models using the index of the different elements in the video to identify the matching video clip;

generating a replacement video clip according to a spatio-temporal analysis by the one or more ML models to identify movement of an object or changes in a scene of the specified content;

generating an audio clip from audio data parsed according to one of silence detection or speaker identification, wherein the audio clip is synchronized to correspond with the replacement video clip according to the spatio-temporal analysis to prevent individual words from being split in the replacement video clip; and automatically replacing the matching video clip with the replacement video clip and the audio clip to generate a revised video, the revised video comprising the replacement content.

2. The data processing system of claim 1, wherein the replacement content comprises the second input text written by the user in the UI element, and the executable instructions, when executed by the processor, further cause the data processing system to perform functions of:

replacing the first input text in the matching video clip with the second input text written by the user to generate the replacement video clip; and automatically replacing the matching video clip with the replacement video clip in response to receiving the user request.

3. The data processing system of claim 1, wherein the replacement content comprises the second image file selected by the user with the UI element specifically for the request to search for the specified content, the second image of the image file being incorporated into the replacement video clip.

4. The data processing system of claim 1, wherein the executable instructions, when executed by the processor, further cause the data processing system to perform functions of:

generating the index for the video, the index including a text index, an audio clip index and a video clip index;

extracting features from the specified content; and comparing the index with the extracted features to identify the matching video clip.

5. The data processing system of claim 4, wherein intersection over union of the different elements is used to identify the matching video clip.

6. The data processing system of claim 4, wherein the executable instructions, when executed by the processor, further cause the data processing system to perform functions of generating a plurality of video clips from the video before generating the index.

7. The data processing system of claim 1, wherein the executable instructions, when executed by the processor, further cause the data processing system to perform functions of:

providing the matching video clip for display in the UI element;

receiving one of a selection of the matching video clip for replacement or a user input for ignoring the matching video clip; and storing data related to the selection or the user input for use in training the ML models that identify the matching video clip.

8. A method for searching for an element in a video and replacing a portion of the video comprising:

receiving, from a user, a request to search for specified content in the video, the specified content being one of first input text, a first audio file, a first image file or a first video file;

presenting, to the user, a user interface (UI) element for loading any of the first input text, the first audio file, the first image file or the first video file to identify the specified content, the UI element also accepting from the user any of a second input text, a second audio file, a second image file or a second video file as replacement content corresponding to the specified content for replacing the specified content in the video;

generating an index of different elements in the video by frame;

operating one or more machine-learning (ML) models to identify a matching video clip within the video, the matching video clip being a video clip that includes one or more elements that match the specified content, the one or more elements including one or more of text, audio and video elements, the one or more ML models using the index of the different elements in the video to identify the matching video clip;

generating a replacement video clip according to a spatio-temporal analysis by the one or more ML models to identify movement of an object or changes in a scene of the specified content;

generating an audio clip from audio data parsed according to one of silence detection or speaker identification, wherein the audio clip is synchronized to correspond with the replacement video clip according to the spatio-temporal analysis to prevent individual words from being split in the replacement video clip; and automatically replacing the matching video clip with the replacement video clip and the audio clip to generate a revised video, the revised video comprising the replacement content.

9. The method of claim 8, wherein generating the index includes:

parsing the video into a plurality of video clips;

parsing an audio portion of the video into a plurality of the audio clips;

extracting text from the video;

using a first ML model to extract video features from the plurality of video clips;

using a second ML model to extract audio features from the plurality of the audio clips; and generating the video index from the text, the video features and the audio features.

10. The method of claim 9, wherein extracting text from the video includes:

utilizing optical character recognition to extract text from images within the video;

utilizing speech to text conversion to convert spoken words within the audio portion of the video to text;

generating tokens from the extracted text; and filtering the tokens to generate a text index.

11. The method of claim 9, wherein the video is parsed into the plurality of video clips based on temporal scene differences.

12. The method of claim 8, wherein replacing the identified portion of the video with a replacement portion includes automatically synching a timing of the video with a timing of the replacement portion.

13. The method of claim 8, wherein the replacement portion is received via the UI element.

14. A non-transitory computer readable medium on which are stored instructions that, when executed, cause a programmable device to perform functions of:

receiving, from a user, a request to search for specified content in a video, the specified content being one of first input text, a first audio file, a first image file or a first video file;

presenting, to the user, a user interface (UI) element for loading any of the first input text, the first audio file, the first image file or the first video file to identify the specified content, the UI element also accepting from the user any of a second input text, a second audio file, a second image file or a second video file as replacement content corresponding to the specified content for replacing the specified content in the video;

generating an index of different elements in the video by frame;

operating one or more machine-learning (ML) models to identify a matching video clip within the video, the matching video clip being a video clip that includes one or more elements that match the specified content, the one or more elements including one or more of text, audio and video elements, the one or more ML models using the index of the different elements in the video to identify the matching video clip;

generating a replacement video clip according to a spatio-temporal analysis by the one or more ML models to identify movement of an object or changes in a scene of the specified content;

generating an audio clip from audio data parsed according to one of silence detection or speaker identification, wherein the audio clip is synchronized to correspond with the replacement video clip according to the spatio-temporal analysis to prevent individual words from being split in the replacement video clip; and automatically replacing the matching video clip with the replacement video clip and the audio clip to generate a revised video, the revised video comprising the replacement content.

15. The non-transitory computer readable medium of claim 14, wherein the replacement content comprises the second input text written by the user in the UI element, and the instructions when executed further cause the programmable device to perform functions of:

replacing the first input text in the matching video clip with the second input text written by the user to generate the replacement video clip; and automatically replacing the matching video clip with the replacement video clip in response to receiving the user request.

16. The non-transitory computer readable medium of claim 14, wherein the replacement content comprises the second audio file selected by the user with the UI element, the audio of the second audio file being incorporated into the replacement video clip.

17. The non-transitory computer readable medium of claim 14, wherein the instructions when executed further cause the programmable device to perform functions of:

generating the index for the video, the index including a text index, an audio clip index and a video clip index;

extracting features from the specified content; and comparing the video index with the extracted features to identify the matching video clip.

18. The non-transitory computer readable medium of claim 14, wherein the index is generated by using one or more ML models.

* * * * *